(12) United States Patent
Kaneria

(10) Patent No.: US 12,205,174 B2
(45) Date of Patent: Jan. 21, 2025

(54) PROBABILITY BASED HEALTH CLAIMS PROCESSING

(71) Applicant: Evernorth Strategic Development, Inc., St. Louis, MO (US)

(72) Inventor: Ankur Kaneria, Cedar Park, TX (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 0 days.

(21) Appl. No.: 17/670,578

(22) Filed: Feb. 14, 2022

(65) Prior Publication Data

US 2023/0260040 A1   Aug. 17, 2023

(51) Int. Cl.
G06Q 40/08   (2012.01)
G06N 20/00   (2019.01)
G06Q 10/10   (2023.01)

(52) U.S. Cl.
CPC .......... *G06Q 40/08* (2013.01); *G06N 20/00* (2019.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 5,253,164 A * | 10/1993 | Holloway | ............. | G06Q 40/02 705/2 |
| 6,879,959 B1 * | 4/2005 | Chapman | ............. | G06Q 40/08 705/2 |
| 7,174,302 B2 * | 2/2007 | Patricelli | ............. | G06Q 20/227 705/2 |
| 8,036,918 B1 * | 10/2011 | Pinsonneault | ......... | G16H 20/10 705/2 |
| 8,346,570 B2 | 1/2013 | Kalies | | |
| 8,489,415 B1 * | 7/2013 | Ringold | ................. | G06Q 10/10 705/2 |
| 8,521,557 B1 * | 8/2013 | Ringold | ................. | G06Q 40/08 705/2 |
| 8,554,575 B1 * | 10/2013 | Patricelli | ............. | G06Q 20/102 705/2 |

(Continued)

OTHER PUBLICATIONS

P. Saripalli, V. Tirumala and A. Chimmad, "Assessment of healthcare claims rejection risk using machine learning," 2017 IEEE 19th International Conference on e-Health Networking, Applications and Services (Healthcom), Dalian, China, 2017, pp. 1-6, doi: 10.1109/HealthCom.2017.8210758. (Year: 2017).*

(Continued)

*Primary Examiner* — Mohammad Z Shaikh
(74) *Attorney, Agent, or Firm* — Miller Johnson

(57) ABSTRACT

Systems and methods herein describe probability-based health claims processing. The described systems and methods access a plurality of pharmacy claims, determine an aggregate rating of the pharmacy claims based on pharmacy claims data, submit a first subset of pharmacy claims to a first pharmacy claims approval system, submit a second subset of pharmacy claims of the plurality of pharmacy claims to a second pharmacy claims approval system, receive, from the first pharmacy claims approval system, a first set of decisions for the first subset of pharmacy claims, and, receive from the second pharmacy claims approval system, a second set of decisions for the second subset of pharmacy claims.

17 Claims, 8 Drawing Sheets

(56) References Cited

U.S. PATENT DOCUMENTS

| | | | | |
|---|---|---|---|---|
| 8,560,340 | B1* | 10/2013 | Ringold | G06Q 40/08 |
| | | | | 705/2 |
| 8,799,030 | B1* | 8/2014 | Chen | G16H 20/10 |
| | | | | 705/4 |
| 9,786,023 | B2 | 10/2017 | Cohan | |
| 10,157,262 | B1* | 12/2018 | Pinsonneault | G16H 40/20 |
| 10,289,804 | B2* | 5/2019 | Chapman | G06Q 40/02 |
| 10,467,379 | B2* | 11/2019 | Van Arkel | G06Q 10/10 |
| 10,475,140 | B2 | 11/2019 | Patel | |
| 10,476,821 | B2 | 11/2019 | Ahmad | |
| 10,642,957 | B1* | 5/2020 | Pinsonneault | G16H 20/10 |
| 10,867,695 | B2 | 12/2020 | Neagle, III | |
| 10,897,461 | B2 | 1/2021 | Schwartz | |
| 11,315,196 | B1* | 4/2022 | Narayan | G06F 18/2193 |
| 11,437,137 | B1* | 9/2022 | Harris | G06F 16/2237 |
| 11,538,112 | B1* | 12/2022 | Singh | G06Q 10/10 |
| 2004/0148198 | A1 | 7/2004 | Kalies | |
| 2005/0137912 | A1* | 6/2005 | Rao | G06Q 40/08 |
| | | | | 705/4 |
| 2006/0217824 | A1* | 9/2006 | Allmon | G06Q 40/08 |
| | | | | 700/90 |
| 2009/0125348 | A1* | 5/2009 | Rastogi | G06Q 30/0202 |
| | | | | 705/7.32 |
| 2009/0254372 | A1* | 10/2009 | Bartholomew, III | G16H 10/20 |
| | | | | 705/2 |
| 2010/0145734 | A1* | 6/2010 | Becerra | G06Q 40/08 |
| | | | | 705/4 |
| 2010/0153293 | A1 | 6/2010 | Fox | |
| 2011/0196697 | A1 | 8/2011 | Akers | |
| 2011/0282690 | A1* | 11/2011 | Patel | G16H 15/00 |
| | | | | 705/3 |
| 2012/0053960 | A1 | 3/2012 | Gatti | |
| 2013/0006668 | A1* | 1/2013 | Van Arkel | G06Q 10/10 |
| | | | | 705/3 |
| 2013/0110555 | A1* | 5/2013 | Dunham | G06Q 40/08 |
| | | | | 705/4 |
| 2013/0325511 | A1 | 12/2013 | Neagle, III | |
| 2014/0081652 | A1* | 3/2014 | Klindworth | G06Q 10/0635 |
| | | | | 705/2 |
| 2014/0142971 | A1 | 5/2014 | Panagakos | |
| 2014/0149128 | A1* | 5/2014 | Getchius | G16H 50/20 |
| | | | | 705/2 |
| 2014/0149129 | A1* | 5/2014 | Getchius | G06Q 40/08 |
| | | | | 705/2 |
| 2014/0222456 | A1 | 8/2014 | Abou Nader | |
| 2014/0303992 | A1 | 10/2014 | Scantland | |
| 2016/0103978 | A1 | 4/2016 | Stong | |
| 2016/0110512 | A1* | 4/2016 | Adjaoute | G16H 40/20 |
| | | | | 705/2 |
| 2016/0267231 | A1* | 9/2016 | Gunjan | G06Q 40/08 |
| 2017/0351821 | A1* | 12/2017 | Tanner, Jr. | G16H 50/20 |
| 2018/0075213 | A1* | 3/2018 | Hill, Sr. | G06Q 50/22 |
| 2018/0089379 | A1* | 3/2018 | Collins | G06Q 10/1057 |
| 2018/0357690 | A1 | 12/2018 | Muthupandi | |
| 2019/0005198 | A1* | 1/2019 | Richards | G06Q 10/10 |
| 2020/0327618 | A1* | 10/2020 | Blakeman | G06Q 10/063116 |
| 2021/0056490 | A1* | 2/2021 | Dornean | G06Q 40/08 |
| 2021/0326999 | A1* | 10/2021 | Adjaoute | G06Q 10/10 |
| 2021/0406805 | A1* | 12/2021 | King | G06Q 10/105 |
| 2022/0028513 | A1* | 1/2022 | Gangaikondan-Iyer | |
| | | | | G06Q 40/08 |
| 2022/0044328 | A1* | 2/2022 | Ligon | G16H 10/60 |
| 2022/0156573 | A1* | 5/2022 | Rui | G06N 3/08 |
| 2022/0319678 | A1* | 10/2022 | Harada | G06Q 10/063112 |
| 2023/0142392 | A1* | 5/2023 | Mandal | G06N 7/01 |
| | | | | 706/46 |
| 2023/0245241 | A1* | 8/2023 | Sulek | G06Q 40/08 |
| | | | | 705/4 |

OTHER PUBLICATIONS

Kim, Hak-Byung et al., "Deep Claim: Payer Response Prediction from Claims Data with Deep Learning", e Healthcare Systems, Population Health, and the Role of Health-Tech (HSYS) Workshop at the 37th International Conference on Machine Learning, Vienna, Austria, Jul. 13, 2020, pp. 1-9. (Year: 2020).*

* cited by examiner

PROBABILITY BASED HEALTH CLAIMS PROCESSING

TECHNICAL FIELD

Systems and methods herein generally relate to health claims processing. More specifically, but not by way of limitations, embodiments herein describe a health claims processing using probability-based models.

BACKGROUND

Processing pharmacy claims is an important yet time consuming task. At a large scale, processing over one billion pharmacy claims per year is a computationally intensive task.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments herein describe a predictive model to guide processing of health claims utilizing at least two different claims processing systems, e.g., an adjudicator internal computing system and a cloud computing system, with the predictive model sending some identified or selected claims to the cloud computing system The claims processing system optimizes the processing of health claims including but not limited to pharmacy claims, medical claims, dental claims, vision claims, behavioral claims and the like. The claims processing system identifies and prioritizes claims based on claims data. In an example, a predictive modeler generates a predictive model based on the claims data and the types of functions for adjudication that can be performed in the cloud or remote adjudication. For example, the claims processing system generates a claim rating for each claim based on the claims data. If the claim rating falls below a predetermined threshold, the claims processing system provides the claims to be processed through a first claims approval system. If the claim rating meets or exceeds a predetermined threshold, the claims processing system provides the claims to be processed through a second claims approval system. The first claims approval system may be a system that analyzes the claim aspects in real-time. The first claims approval system may also be referred to as an adjudicator internal computing system. The second claims approval system may be a system that analyzes the claim using a statistical model that is trained on historical claims data. The second claims approval system may generate a claims decision faster than the first claims approval system. The second claims approval system may also be referred to as a cloud computing system. In some examples, the second claims approval system is used when the first claims approval system fails. In another example, the second claims approval is used when the first claims approval is experiencing a high volume of incoming claim approval requests. Bypassing the first claims approval system may also be more efficient if the claim involves a generic drug that does not to be evaluated on a per case basis. Thus, by prioritizing which claims are processed by the first claims approval system and which claims are processed by the second claims approval system, the claims processing system improves and optimizes traditional methods of health claims processing.

HIGH-VOLUME PHARMACY

Figure 1:
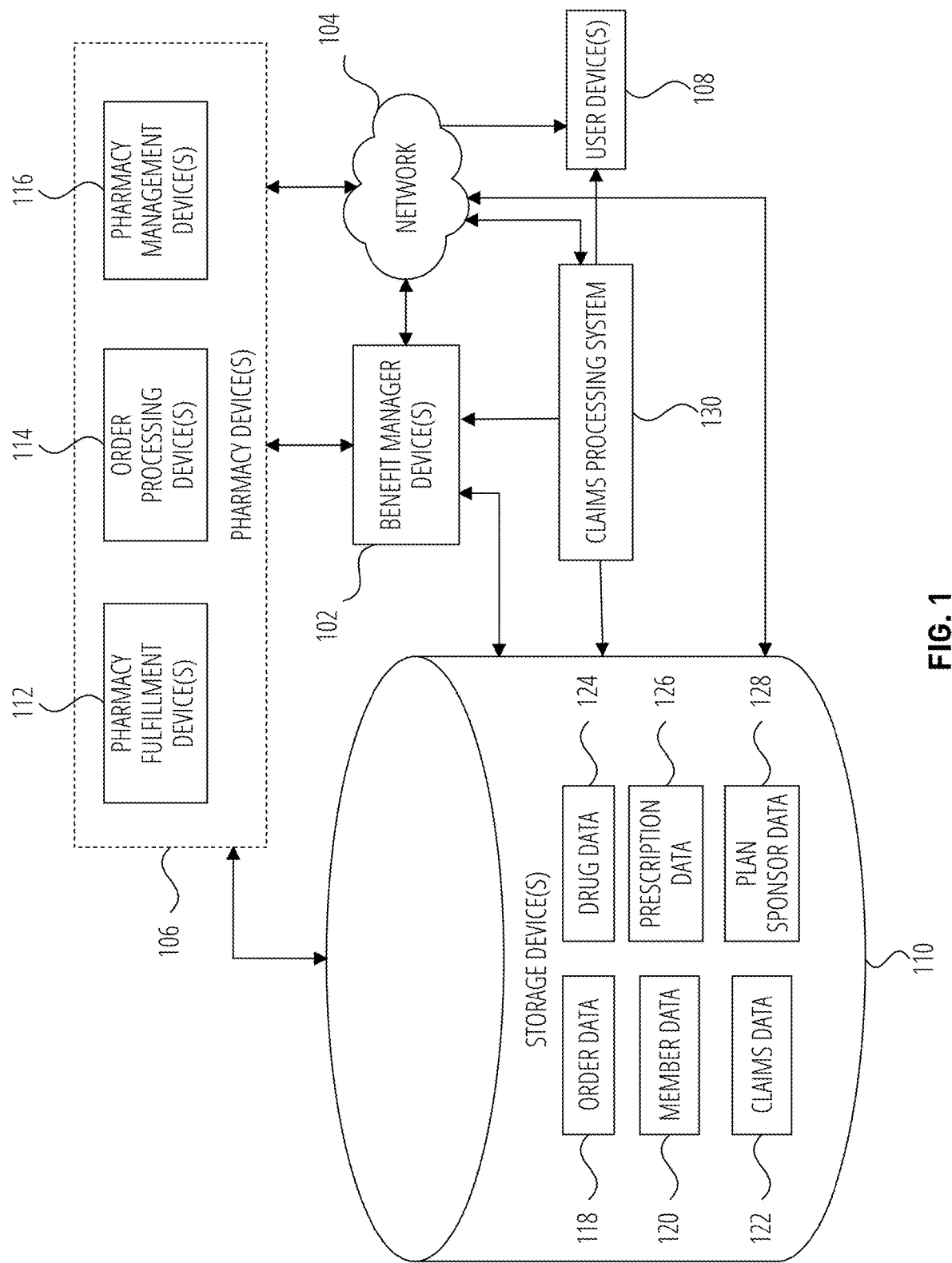
FIG. 1 is a block diagram of an example implementation of a system for a high-volume pharmacy, according to example embodiments.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104. The system may include a claims processing system 130 and a storage device 110.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in the storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device(s) 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118. The order data 118 can be used in the predictive model (e.g., claims rating generator 406) to guide at least part of the adjudication of an identified claim record in the secondary, remote adjudication computing system.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably. The member data 120 can be used in the predictive model (e.g., claims rating generator 406) to guide at least part of the adjudication of an identified claim record in the secondary, remote adjudication computing system.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). The claims data 122 can be used in the predictive model (e.g., claims rating generator 406) to guide at least part of the adjudication of an identified claim record in the secondary, remote adjudication computing system.

The drug data 124 may include drug name (e.g., technical name and/or common name), other names by which the drug is known, active ingredients, an image of the drug (such as in pill form), etc. The drug data 124 may include information associated with a single medication or multiple medications. The drug data 124 can be used in the predictive model (e.g., claims rating generator 406) to guide at least part of the adjudication of an identified claim record in the secondary, remote adjudication computing system.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.). The prescription data 126 can be used in the predictive model (e.g., claims rating generator 406) to guide at least part of the adjudication of an identified claim record in the secondary, remote adjudication computing system.

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc. The plan sponsor data 128 can be used in the predictive model (e.g., claims rating generator 406) to guide at least part of the adjudication of an identified claim record in the secondary, remote adjudication computing system.

The claims processing system 130 optimizes the processing of health claims including but not limited to pharmacy claims, medical claims, dental claims, vision claims, and the like. The claims processing system 130 identifies and prioritizes claims based on claims data. For example, the claims processing system 130 generates a claim rating for each claim based on the claims data. If the claim rating falls below a predetermined threshold or set threshold, the claims processing system 130 provides the claims to be processed through a first claims approval system. If the claim rating meets or exceeds a predetermined threshold or set threshold, the claims processing system 130 provides the claims to be processed through a second claims approval system. The first claims approval system may be a system that analyzes the claim aspects in real-time. The first claims approval system may generate decisions that indicate if the health claim is approved or not. For example, the first claims approval system validates a health claim based on several factors (which can be stored as electronic values in a machine readable record) such as: such as whether a member has an active benefit plan, if the prescribing physician is valid, if the prescribed drug is valid, if the drug is covered by the benefit plan, if the submitting pharmacy is a valid pharmacy, if the drug is an authorized drug, does the drug pass a drug utilization review, is the drug safe for the given member, is there a prior authorization in place, and the like. The second claims approval system may be a system that analyzes the claim using one or more statistical models and machine learning models that are trained on historical claims data. One or several models may be used to analyze a claim. The first claims approval system can be a physically separate computing system than the second claims approval system. The second claims approval system may be a cloud computing system while the first claims approval system may exist on a local machine. The first claims approval system may generate decisions that indicate if the health claim is approved or not. The historical claims data may include generated decisions by the first claims approval system. The second claims approval system may generate claims decisions faster than the first claims approval system. Thus, by prioritizing which claims are processed by the first claims approval system and which claims are processed by the second claims approval system, the claims processing system 130 improves and optimizes traditional methods of health claims processing.

Figure 4:
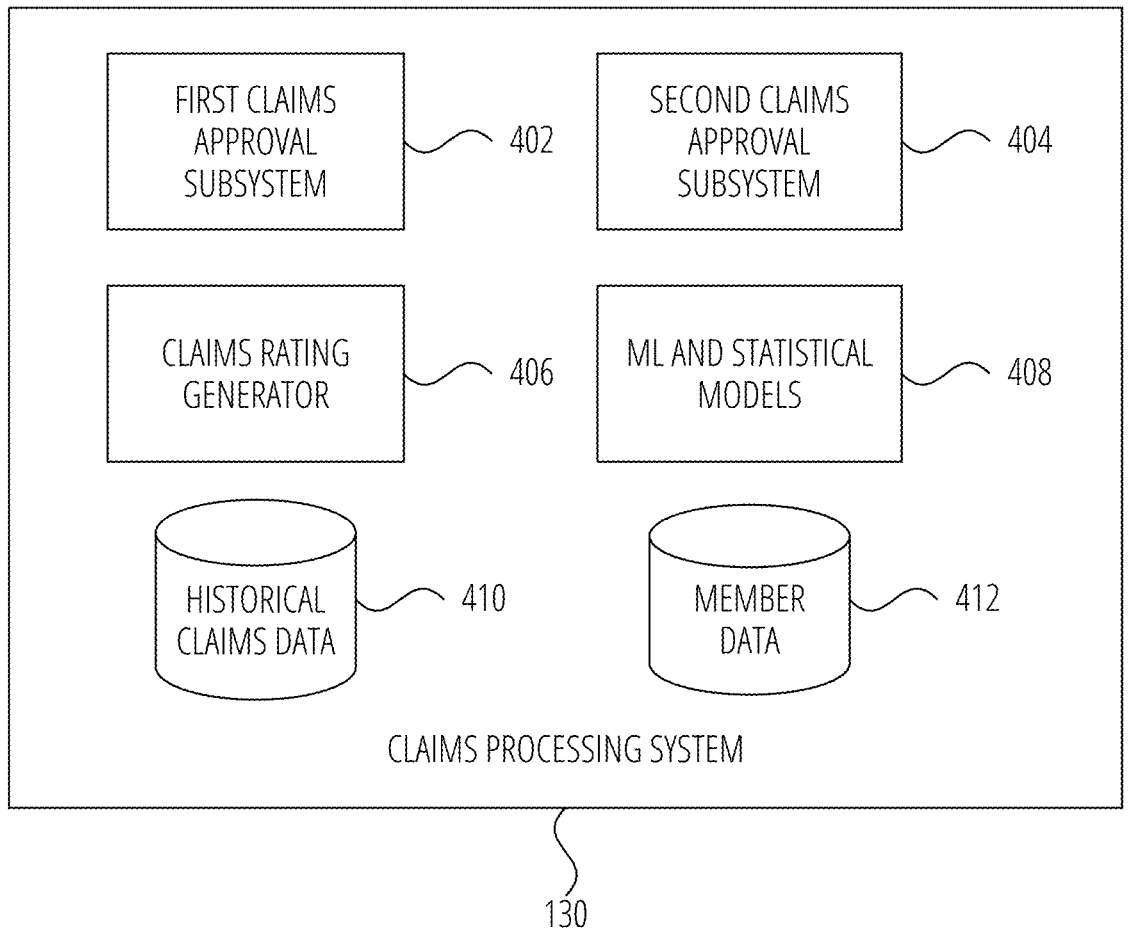
FIG. 4 is a block diagram of a claims processing system, according to example embodiments.
Figure 5:
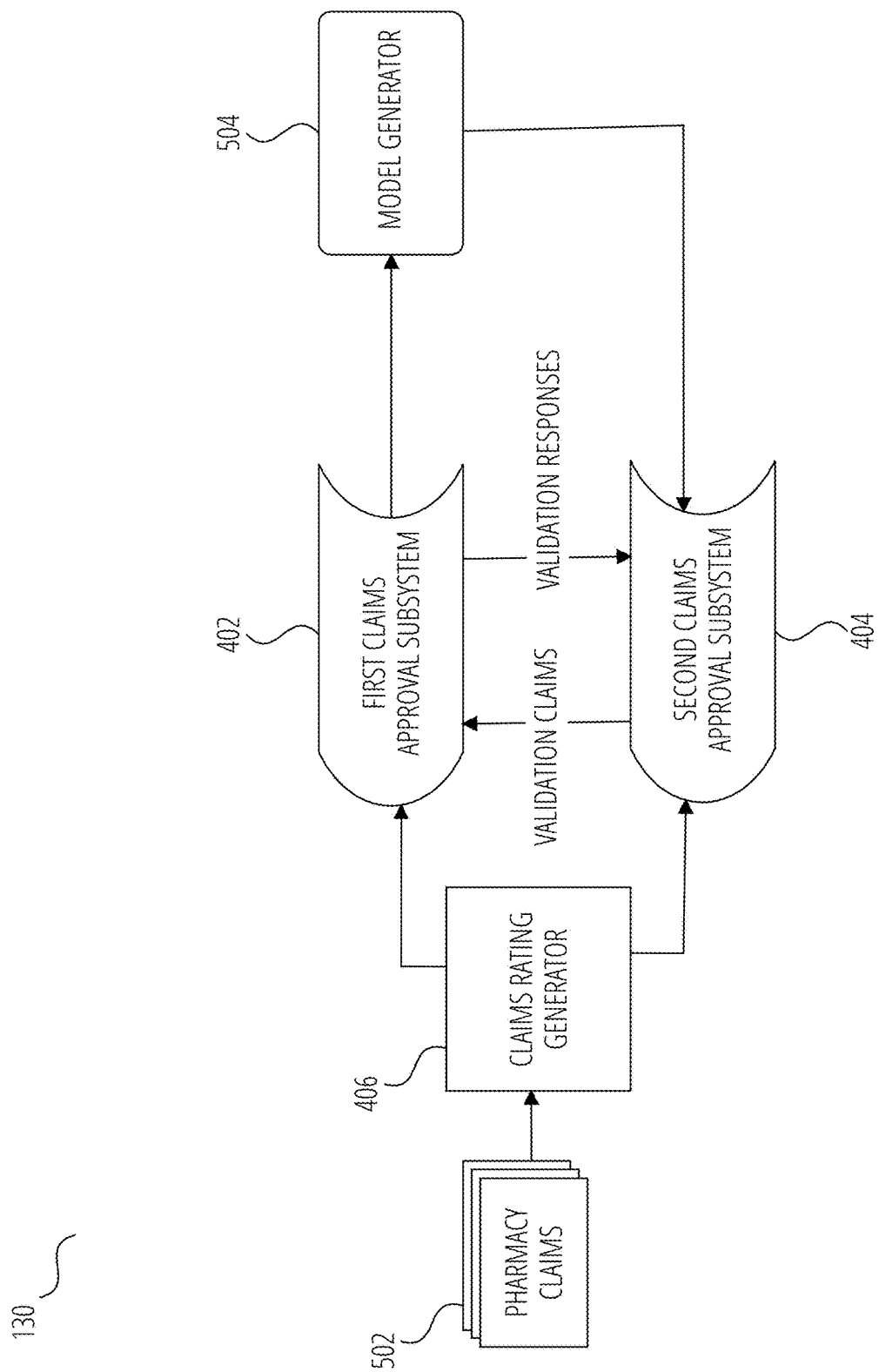
FIG. 5 is an illustration of a claims processing system, according to example embodiments.
Figure 6:
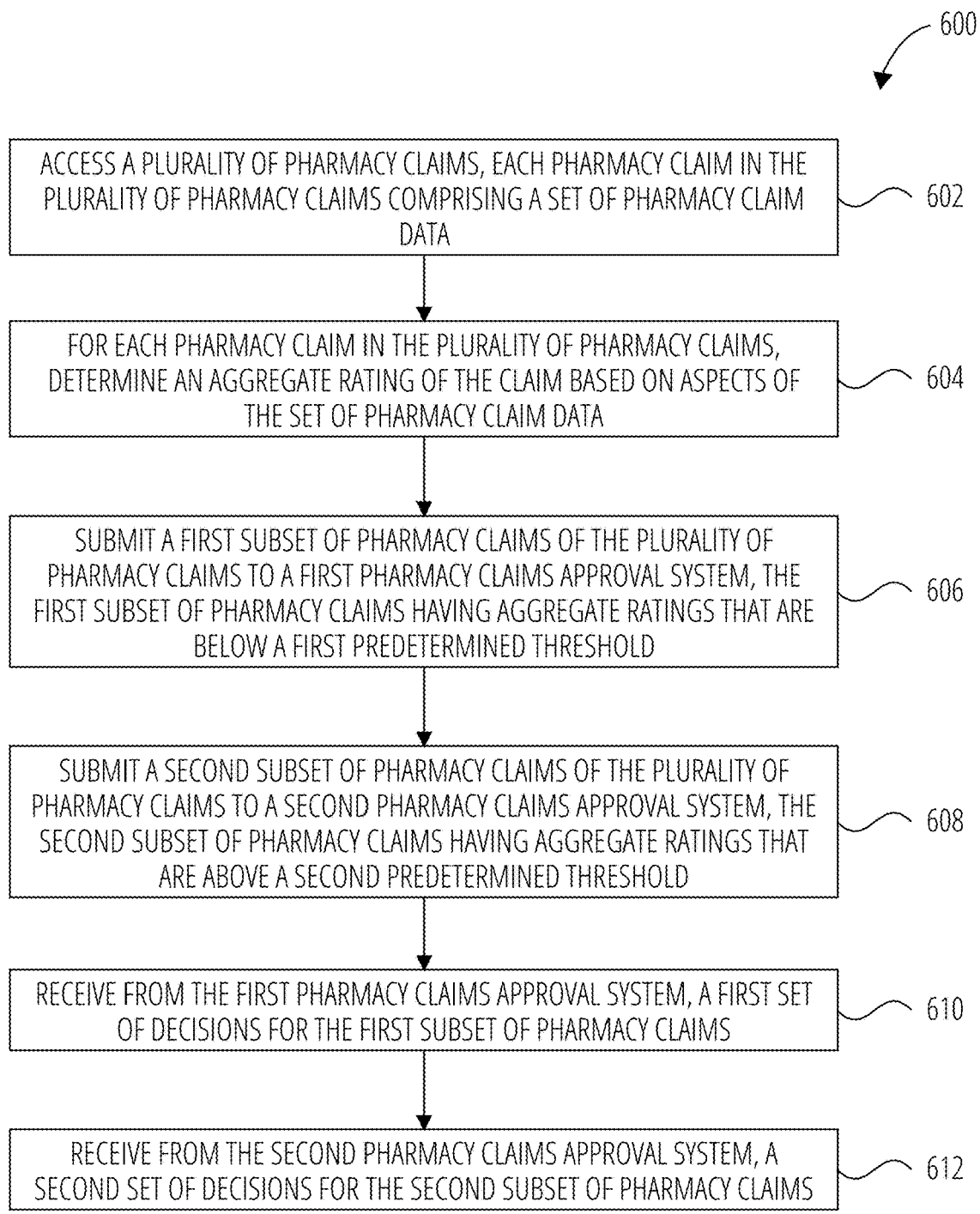
FIG. 6 is a flowchart of an example method for generating a claims decision for a plurality of pharmacy claims using a claims processing system, according to example embodiments

Further details of the claims processing system 130 are provided in FIGS. 4-6.

Figure 2:
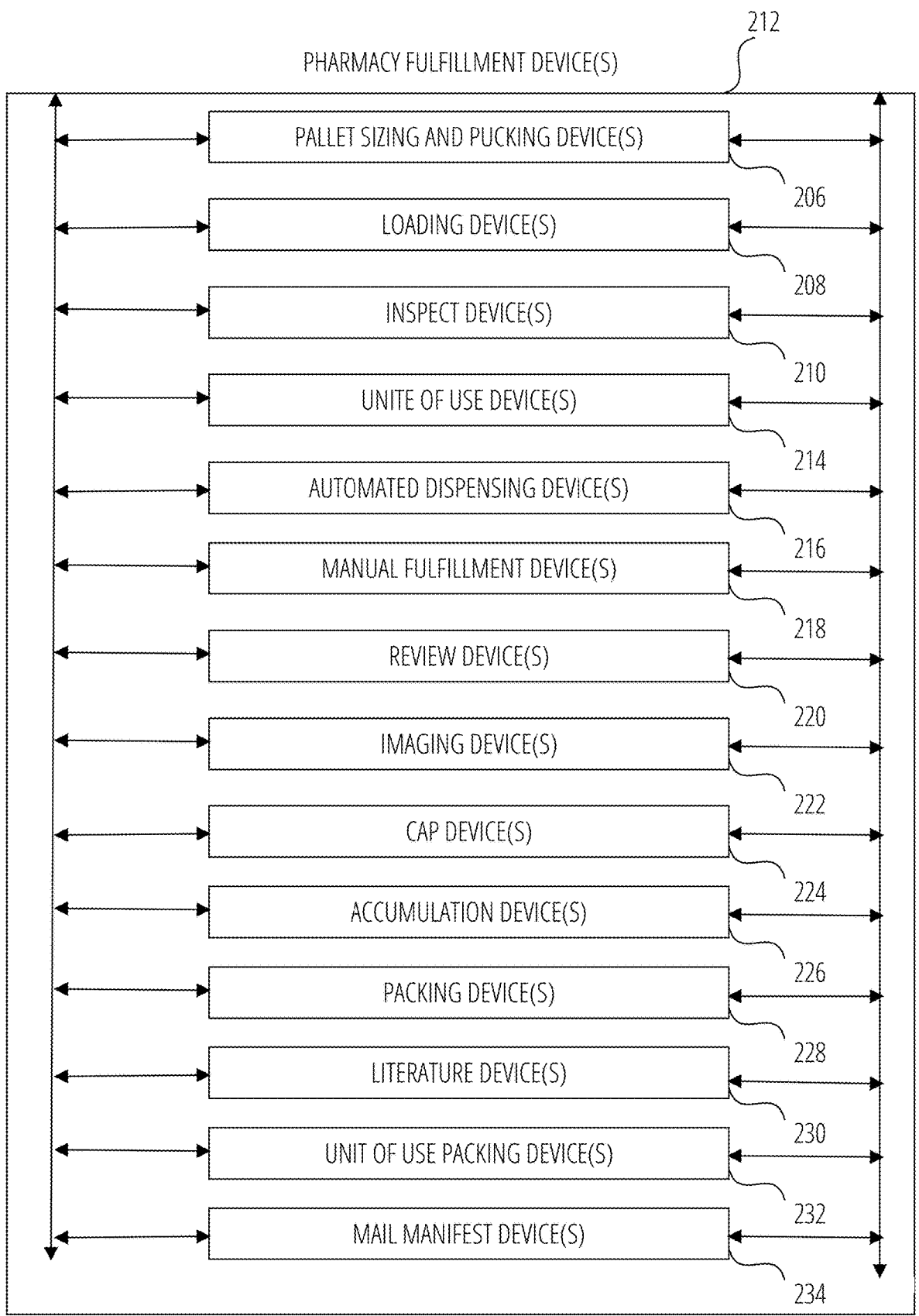
FIG. 2 illustrates the pharmacy fulfillment device according to example embodiments.

FIG. 2 illustrates the pharmacy fulfillment device 112 according to an example implementation. The pharmacy fulfillment device 112 may be used to process and fulfill prescriptions and prescription orders, which are adjudicated according to the teachings in the present disclosure. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
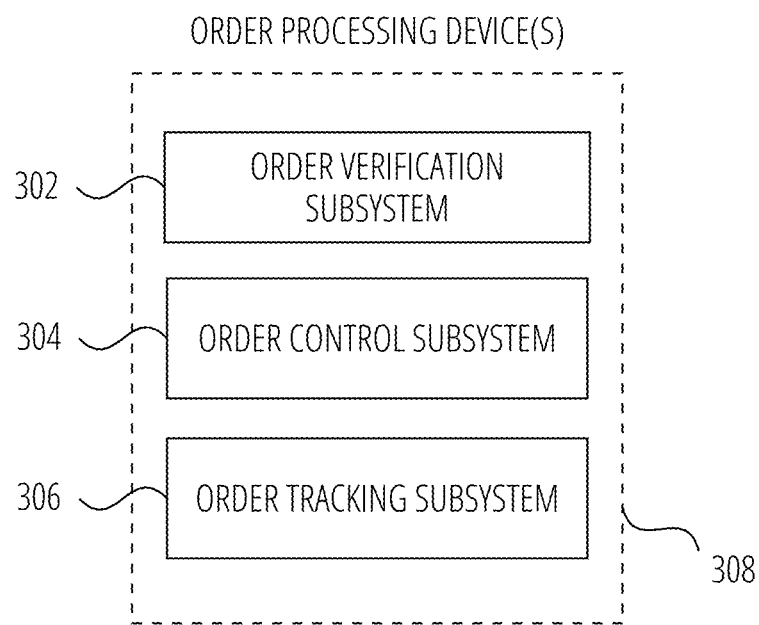
FIG. 3 illustrates the order processing device according to example embodiments.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

The claims processing system 130 in FIG. 4 includes a first claims approval subsystem 402, a second claims approval subsystem 404, a claims rating generator 406, one or more machine learning and statistical models 408, historical claims data 410 and member data 412. The claims processing system 130 can further include elements described with respect to FIG. 7 and FIG. 8 as a processor and memory, having instructions stored thereon, that when executed by the processor, causes the processor to control the functions of the claims processing system 130.

The claims rating generator 406 generates ratings for each health claim based on aspects of the health claim. For purposes of the discussion below, the health claim described is a pharmacy claim. It is to be understood that the health claim may be any type of health claim such as a pharmacy claim, dental claim, vision claim, medical claim, and the like. In some examples, the pharmacy claim includes a set of pharmacy claims data. The pharmacy claims data may be used by the claims rating generator 406 to generate ratings for a pharmacy claim. Some aspects of a health claim may be factors regarding the categories related to side effects that may be severe, a complex therapy regimen, controlled substance, or the like.

The pharmacy claims data include a claims rating of a drug, a claims rating of a physician, a claims rating of a benefit group, a claims rating of a member, and any combination thereof. The claims rating of the drug is based on information about the prescribed drug. The claims rating of the physician is based on information about the prescribing physician. The claims rating of the pharmacy is based on information about the pharmacy. The claims rating of the member is based on information about the member. The claims rating of the member data may be included in the member data 120. The claims rating of the benefit group is based on information about the benefit group. The benefit group may include an association, corporation or any organization engaged in the business of providing health insurance.

For example, the pharmacy claims data may include the claims rating of a drug and a physician. For purposes of the description below, a claims rating may be represented as Claims Rating (Drug & Physician). In this example, the claims rating is specific to a particular drug and a particular physician. For example, the claims rating may be based on how many times a prescribing physician has prescribed the particular drug. The claims rating is associated with an approval rate. Thus, the claims rating based on how many times a prescribing physician has prescribed the particular drug as described above may be scored between zero and one, where zero indicates the claim is unlikely to be approved and one indicates the claim is highly likely to be approved.

In one example, the pharmacy claims data consists of a single data point. For example, the pharmacy claims data may be represented as Claims Rating (Physician). In this example, the claims rating is specific to a particular physician. For example, the claims rating may be based on if the physician has a valid and active license, past claims history of prescriptions written by that particular physician, an approval rate of the physician's past claims, and the like.

In another example, the pharmacy claims data may be represented as, Claims Rating (Physician & Pharmacy & Benefit Group). In this example, the claims rating is specific to a particular physician and particular pharmacy and particular benefit group. For example, the claims rating may be based on the number of approved claims placed by a prescribing physician at a specific pharmacy for members within a particular benefit group.

In another example, the pharmacy claims data may be represented as, Claims Rating (Drug & Benefit Group). In this example, the claims rating may be based on if the drug is covered by the benefit group. In another example, the pharmacy claims data may be represented as Claims Rating (Member & Benefit Group). In this example, the claims rating may be based on if the member is covered by the benefit group.

It is to be understood that the pharmacy claims data may include any combination of the claims rating of the drug, a claims rating of a physician, a claims rating of a benefit group, a claims rating of a member, or combinations thereof, as described herein.

A claims rating generator 406 generates a more accurate claims rating (e.g., approval rate of the claim) if the rating is based on multiple data points. For example, the claims rating generator 406 analyzing a Claims Rating (Physician & Drug & Pharmacy & Benefit Group & Member) produces a more accurate claims rating than the claims rating generator 406 analyzing a Claims Rating (Drug).

In some examples, the claims rating generator 406 may not have sufficient information on the specific data points in the pharmacy claims data. For example, a particular member may not have a drug related claim in their history. In that case, the claims rating generator 406 may use the aggregate claim rating of members in the same benefit group as the particular member who have taken the specific drug. The claims rating generator 406 may combine the claims rating of the members in the same benefit group who have used the drug with a rating of the member. An example formula may be as follows:

$$\frac{\text{Claims Rating (Benefit Group \& Drug)} + \text{Claims Rating (Member)}}{2}$$

In some examples, the claims rating generator 406 may use a weighted algorithm to determine a rating for a pharmacy claim. An example pharmacy claims data may be represented as Claims Rating (Pharmacy & Drug). If the claims processing system 130 has more claims ratings of the pharmacy and less claims ratings of the drug, then the claims rating generator 406 may weight the claims ratings of the pharmacy, greater than the claims ratings of the drug.

In another example, the claims rating generator 406 may not have sufficient data to generate an accurate rating for the pharmacy claim. For example, there may not be enough data in the Pharmacy and Drug categories to generate a claims rating. In such cases, the claims rating generator 406 may need to use one or more combinations of categories (e.g., Physician & Pharmacy & Benefit Group) or (Drug & Physician)+(Benefit Group & Pharmacy). In this way, the claims rating generator 406 achieves a reliable claims rating based on sufficient data points. It is to be understood that the claims rating generator 406 may use any number of combinations of categories to generate a claims rating of the drug.

The claims rating generator 406 generates a rating for the pharmacy claim based on the above-mentioned pharmacy claims data for each pharmacy claim. If the rating is below a predetermined threshold (under 0.4) then the claims processing system 130 submits the claim to the first claims approval subsystem 402. If the rating meets or is above a predetermined threshold or set threshold (0.4, +/−10%), then the claims processing system 130 submits the claim to the second claims approval subsystem 404.

The first claims approval subsystem 402 processes claims by validating each data point in the pharmacy claims data. For example, the first claims approval subsystem 402 may validate that the drug is an approved drug, the pharmacy is in network, the prescribing physician has a valid, active license, the drug is covered under the benefit group, and the member or patient is covered under the benefit group. The first claims approval subsystem 402 generates a claims decision for each claim. The claims decision includes, for example, whether the claim is approved by the claims processing system 130. The claims decision may further include whether the member or patient associated with the claim may receive the medication included in the pharmacy claim, and the cost associated with the medication. The generated claims decisions are provided to one or more machine learning (ML) and statistical models 408 for training. The one or more machine learning and statistical models 408 generate a probability that a given pharmacy claim will be approved.

The second claims approval subsystem 404 processes pharmacy claims using one or more machine learning models and statistical models (e.g., the machine learning and statistical models 408) that generate a claims decision for each claim based on a set of training data. Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for processing pharmacy claims.

The machine-learning algorithms utilize features for analyzing the data to generate assessments. A feature is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

The machine-learning algorithms utilize the training data to find correlations among the identified features that affect the outcome or assessment. In some example embodiments, the training data includes labeled data, which is known data for one or more identified features and one or more outcomes, such as whether a health claim should be approved or not.

A statistical model uses mathematical models and statistics to generate predictions about a dataset. Statistical models include but are not limited to logistic regression, time-series, clustering, and decision trees.

The claim decision includes, for example, whether the claim is approved by the claims processing system 130. The claims decision may further include whether the member or patient associated with the claim may receive the medication included in the pharmacy claim, and the cost associated with the medication.

In some examples, the first claims approval subsystem 402 and the second claims approval subsystem 404 process claims simultaneously.

The historical claims data 410 is a database that stores, e.g., in a database at the PBM, the generated claims decisions from the first claims approval subsystem 402 and the second claims approval subsystem 404. The member data 412 may be a database that stores the member data 120.

FIG. 5 is an illustration of a claims processing system 130, according to example embodiments.

The claims processing system 130 accesses pharmacy claims 502. The pharmacy claims 502 may be accessed from one or more Pharmacy Device(s) 106. The pharmacy claims 502 pass through the claims rating generator 406. The claims rating generator 406 provides pharmacy claims 502 with a low rating to the first claims approval subsystem 402 and provides pharmacy claims 502 with a high rating to the second claims approval subsystem 404. The first claims approval subsystem 402 generates claims decisions and passes the generated claims decisions to the model generator 504 for training the one or more machine learning and statistical models 408. The machine learning and statistical models 408 generates a probability that a claim will be approved.

The trained machine learning and statistical models 408 are provided to the second claims approval subsystem 404 and are used to generate claims decisions for the portion of the pharmacy claims 502 that are provided to the second claims approval subsystem 404. In some examples, a portion of the claims that are provided to the second claims approval subsystem 404 are also provided to the first claims approval subsystem 402. The claims that are provided to both the first claims approval subsystem 402 and the second claims approval subsystem 404 are used to validate the performance of the second claims approval subsystem 404. The first claims approval subsystem 402 provides real-time feedback to the second claims approval subsystem 404, indicating the performance of the second claims approval subsystem 404. In some examples, the first claims approval subsystem 402 provides real-time feedback, to the claims rating generator 406 to improve the claims rating score and ultimately route the claim to the preferred subsystem (e.g., first claims approval subsystem 402 or second claims approval subsystem 404).

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart of an example method 600 for generating health claims decisions using a claims processing system 130, according to example embodiments. In one example, the processor in a claims processing system 130, the processor in user device(s) 108, pharmacy management device(s) 116, benefit manager device(s) 102, or any combination thereof can perform the operations in the method 600.

At operation 602, the claims processing system 130 accesses a plurality of pharmacy claims. Each pharmacy claim comprises a set of pharmacy claims data. The set of pharmacy claims data includes drug data associated with a drug, physician data associated with a physician, pharmacy data associated with a pharmacy, benefit group data associated with a benefit group and member data associated with a member. The plurality of pharmacy claims may be the pharmacy claims 502.

For each pharmacy claim in the plurality of pharmacy claims, the claims processing system 130 at operation 604, determines an aggregate rating of the claim based on the set of pharmacy claims data. The claims rating generator 406 may determine the aggregate rating of the claim.

At operation 606, the claims processing system 130 submits a first subset of pharmacy claims of the plurality of pharmacy claims to a first pharmacy claims approval system. The first subset of pharmacy claims have aggregate ratings that are below a first predetermined threshold. For example, the first pharmacy claims approval system is the first claims approval subsystem 402. The first predetermined threshold may be a probability between zero and one that the claim will be approved. It is to be understood that any suitable claims rating scoring scheme may be used.

At operation 608, the claims processing system 130 submits a second subset of pharmacy claims of the plurality of pharmacy claims to a second pharmacy claims approval system. The second subset of pharmacy claims have aggregate ratings that are above a second predetermined threshold. The second pharmacy claims approval system may be the second claims approval subsystem 404. The second predetermined threshold may be a probability between zero and one that the claim will be approved.

At operation 610, the claims processing system 130 receives, from the first pharmacy approval system, a first set of decisions for the first subset of pharmacy claims. The first set of decisions may be provided to the model generator 504 for training the machine learning and statistical models 408.

At operation 612, the claims processing system 130 receives, from the second pharmacy approval system, a second set of decisions for the second subset of pharmacy claims.

In some examples, the claims processing system 130 simultaneously provides a portion of the second subset of pharmacy claims to the first pharmacy approval system. The claims processing system 130 generates by the first pharmacy approval system, a set of decisions for the second subset of pharmacy claims and validates the generated set of decisions by the first pharmacy approval system with the received second set of decisions.

The generated first set of decisions indicate if the first subset of pharmacy claims are approved. The generated second set of decisions indicate if the second subset of pharmacy claims are approved. In some examples, the generated first set and second set of decisions are presented on a graphical user interface of a client device (e.g., pharmacy management device(s) 116). The pharmacy claims of the first subset of pharmacy claims that are approved are flagged using a visual flag. The pharmacy claims of the second subset of pharmacy claims that are approved are also flagged using a visual flag. If a pharmacy claim in the first subset or second subset of pharmacy claims is not approved, the claims processing system 130 causes display of a notification identifying the pharmacy claim that is not approved and may optionally include an explanation for the lack of approval.

Software Architecture

Figure 7:
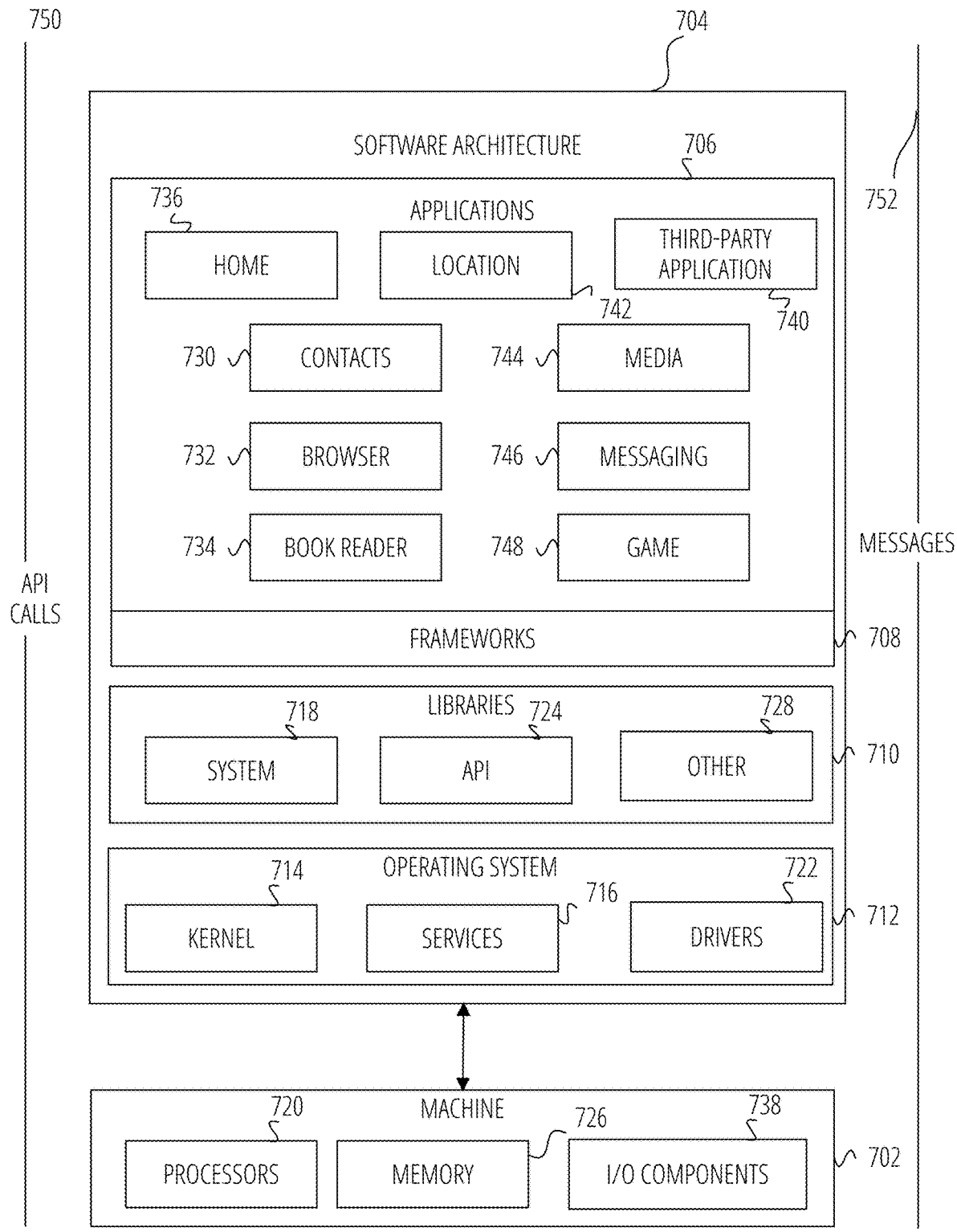
FIG. 7 is a block diagram illustrating a software architecture, which can be installed on any one or more of the devices described herein

FIG. 7 is a block diagram illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740 The applications 706 programs that execute functions defined in the programs. Various programming languages can be employed to create one or more of the applications 706 structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Machine Architecture

Figure 8:
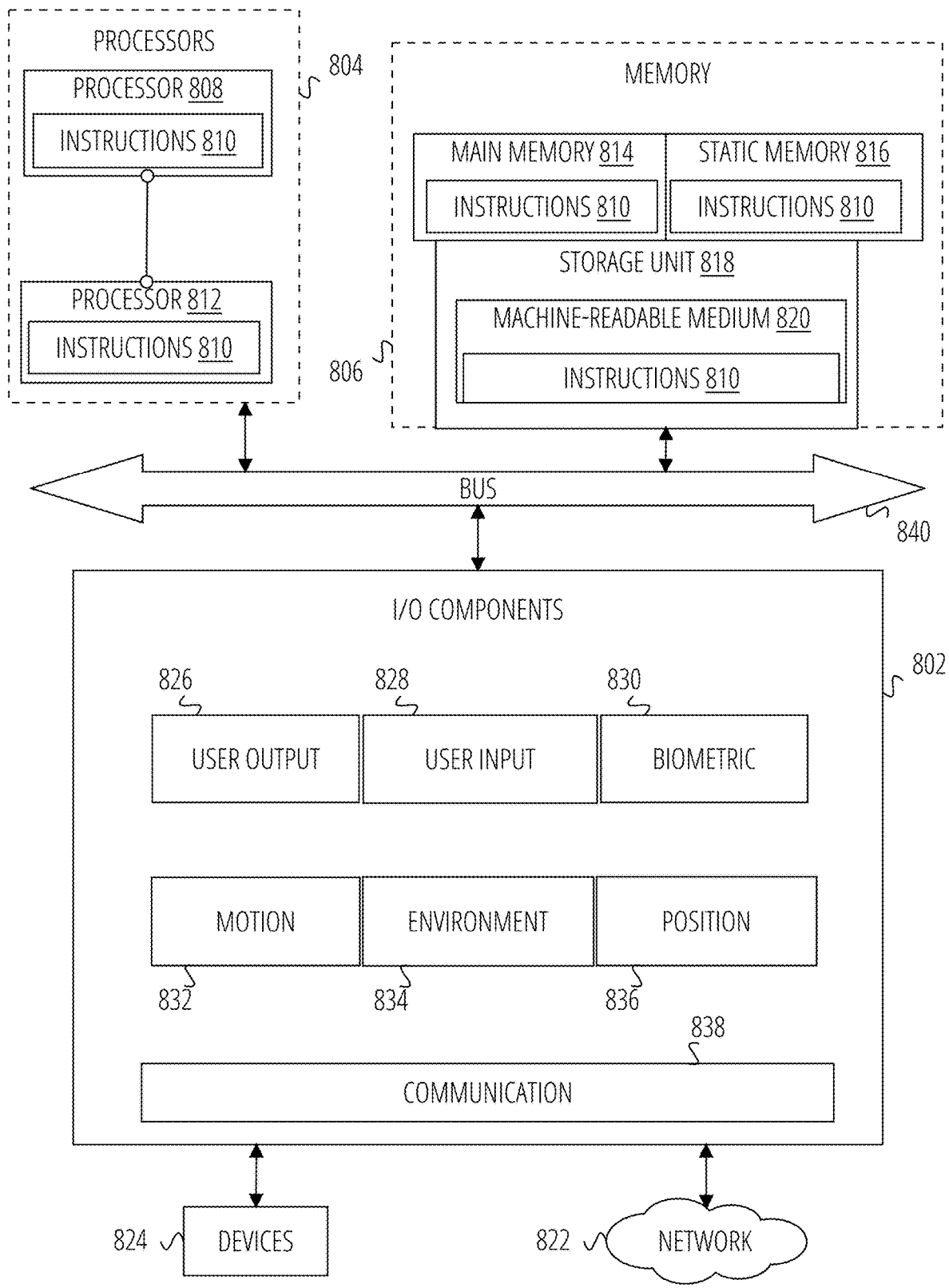
FIG. 8 is a diagrammatic representation of the machine within which instructions (e.g., software, a program, an application, an applet, an app, or other executable code) for causing the machine to perform any one or more of the methodologies discussed herein may be executed

FIG. 8 is a diagrammatic representation of the machine within which instructions 810 (e.g., software, a program, an application, an applet, an app, or other executable code) for causing the machine to perform any one or more of the methodologies discussed herein may be executed. For example, the instructions 810 may cause the machine to execute any one or more of the methods described herein. The instructions 810 transform the general, non-programmed machine into a particular machine programmed to carry out the described and illustrated functions in the manner described. The machine may operate as a standalone device or may be coupled (e.g., networked) to other machines. In a networked deployment, the machine may operate in the capacity of a server machine or a client machine in a server-client network environment, or as a peer machine in a peer-to-peer (or distributed) network environment. The machine may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine. Further, while only a single machine is illustrated, the term "machine" shall also be taken to include a collection of machines that individually or jointly execute the instructions 810 to perform any one or more of the methodologies discussed herein. The machine, for example, may comprise the user device(s) 108 or any one of a number of server devices in mental health management system 130. In some examples, the machine may also comprise both client and server systems, with certain operations of a particular method or algorithm being performed on the server-side and with certain operations of the particular method or algorithm being performed on the client-side.

The machine may include processors 804, memory 806, and input/output I/O components 638, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine may include a single processor with a single-core, a single processor with multiple cores (e.g., a multi-core processor), multiple processors with a single core, multiple processors with multiples cores, or any combination thereof.

The memory 806 includes a main memory 814, a static memory 816 and a storage unit 818 both accessible to the processors 804 via the bus 840. The main memory 814, a static memory 816 and storage unit 818 both store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810)), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

What is claimed is:

1. A method comprising:
    accessing a plurality of pharmacy claims, wherein each pharmacy claim in the plurality of pharmacy claims includes a set of pharmacy claim data;
    for each pharmacy claim in the plurality of pharmacy claims, determining a respective aggregate rating of the pharmacy claim based on the set of pharmacy claim data;
    based on the respective aggregate rating of the plurality of pharmacy claims, selectively processing each of the plurality of pharmacy claims, wherein:
        the selectively processing is performed using at least one of:
            a first pharmacy claims approval system including a real-time claim analysis, or
            a second pharmacy claims approval system including a statistical-model-based claim analysis, and
        the selectively processing includes:
            determining whether a first rating associated with a first subset of pharmacy claims has met a ratings threshold;
            in response to determining that the first rating has not met the ratings threshold, submitting the first subset of pharmacy claims to the first pharmacy claims approval system;
            determining whether a second rating associated with a second subset of pharmacy claims has met the ratings threshold; and
            in response to determining that the second rating associated with the second subset of pharmacy claims has met the ratings threshold, submitting the second subset of pharmacy claims to the second pharmacy claims approval system including a neural network;
    submitting a portion of the second subset of pharmacy claims to the first pharmacy claims approval system;
    receiving, from the first pharmacy claims approval system:
        a first set of decisions for the first subset of pharmacy claims, and
        a set of validation decisions for the portion of the second subset of pharmacy claims;
    storing training data including:

the portion of the second subset of pharmacy claims, and the set of validation decisions;

training the neural network of the second pharmacy claims approval system based on the training data to generate claims decisions for each of the plurality of pharmacy claims in the training data, wherein:

the second pharmacy claims approval system is trained to generate a second set of decisions for the second subset of pharmacy claims, and the neural network is trained by performing training operations including:

accessing the training data;

extracting features from the training data to generate predictions by finding correlations among the extracted features of the plurality of pharmacy claims that affect the set of validation decisions, wherein the predictions include a probability that a given pharmacy claim of the plurality of pharmacy claims will be approved; and building the neural network of the second pharmacy claims approval system to generate new predictions for new pharmacy claims in response to analyzing the training data;

receiving, from the second pharmacy claims approval system, a second set of decisions for the second subset of pharmacy claims;

validating the second set of decisions based on the set of validation decisions;

causing display of the first set of decisions and the second set of decisions on a graphical user interface;

in response to determining that a respective claim of the plurality of pharmacy claims has been approved:

generating a display corresponding to the respective claim with a first visual indicator, identifying a prescription drug associated with the respective claim, and fulfilling the prescription drug without operator intervention by:

automatically controlling movement of a set of containers relative to an automated dispensing device, and automatically dispensing, via the automated dispensing device, the prescription drug into a container of the set of containers; and in response to determining that the respective claim has not been approved:

generating a display corresponding to the respective claim with a second visual indicator, and displaying a notification.

2. The method of claim 1, wherein the set of pharmacy claim data includes at least one of drug data associated with a drug, physician data associated with a physician, pharmacy data associated with a pharmacy, benefit group data associated with a benefit group, or member data associated with a member.

3. The method of claim 1, wherein the portion of the second subset of pharmacy claims are simultaneously provided to the first pharmacy claims approval system.

4. The method of claim 1, further comprising:

routing a portion of the first subset of pharmacy claims to the second pharmacy claims approval system in response to the first set of decisions.

5. The method of claim 1, wherein the second pharmacy claims approval system includes a machine learning model.

6. The method of claim 1, wherein the first set of decisions indicate if the first subset of pharmacy claims is approved.

7. The method of claim 1, wherein the second set of decisions indicate if the second subset of pharmacy claims is approved.

8. A system comprising:

at least one processor; and a memory storing instructions that, when executed by the at least one processor, configure the system to:

access a plurality of pharmacy claims, wherein each pharmacy claim in the plurality of pharmacy claims includes a set of pharmacy claim data;

for each pharmacy claim in the plurality of pharmacy claims, determine a respective aggregate rating of the pharmacy claim based on the set of pharmacy claim data;

based on the respective aggregate rating of the plurality of pharmacy claims, selectively process each of the plurality of pharmacy claims, wherein:

the selectively processing is performed using at least one of:

a first pharmacy claims approval system including a real-time claim analysis, or a second pharmacy claims approval system including a statistical-model-based claim analysis, and the selectively processing includes:

determining whether a first rating associated with a first subset of pharmacy claims has met a ratings threshold;

in response to determining that the first rating has not met the ratings threshold, submitting the first subset of pharmacy claims to the first pharmacy claims approval system;

determining whether a second rating associated with a second subset of pharmacy claims has met the ratings threshold; and in response to determining that the second rating associated with the second subset of pharmacy claims has met the ratings threshold, submitting the second subset of pharmacy claims to the second pharmacy claims approval system comprising a neural network;

submit a portion of the second subset of pharmacy claims to the first pharmacy claims approval system;

receive from the first pharmacy claims approval system:

a first set of decisions for the first subset of pharmacy claims, and a set of validation decisions for the portion of the second subset of pharmacy claims;

store training data including:

the portion of the second subset of pharmacy claims, and the set of validation decisions;

train the neural network of the second pharmacy claims approval system based on the training data to generate claims decisions for each of the plurality of pharmacy claims in the training data, wherein:

the second pharmacy claims approval system is trained to generate a second set of decisions for the second subset of pharmacy claims, and the neural network is trained by performing training operations including:

accessing the training data;

extracting features from the training data to generate predictions by finding correlations among the extracted features of the plurality of pharmacy claims that affect the set of validation decisions, wherein the predictions include a probability that a given pharmacy claim of the plurality of pharmacy claims will be approved; and building the neural network of the second pharmacy claims approval system to generate new predictions for new pharmacy claims in response to analyzing the training data;

receive, from the second pharmacy claims approval system, a second set of decisions for the second subset of pharmacy claims;

validate the second set of decisions based on the set of validation decisions;

cause display of the first set of decisions and the second set of decisions on a graphical user interface;

in response to a determination that a respective claim of the plurality of pharmacy claims has been approved:
   display the respective claim with a first visual indicator,
   identify a prescription drug associated with the respective claim, and
   fulfil the prescription drug without operator intervention by:
      automatically controlling movement of a set of containers relative to an automated dispensing device, and
      automatically dispensing, via the automated dispensing device, the prescription drug into a container of the set of containers; and in response to a determination that the respective claim has not been approved:
   display the respective claim with a second visual indicator, and
   display a notification.

9. The system of claim 8, wherein the set of pharmacy claim data includes drug data associated with a drug, physician data associated with a physician, pharmacy data associated with a pharmacy, benefit group data associated with a benefit group and member data associated with a member, and any combination thereof.

10. The system of claim 8, wherein the portion of the second subset of pharmacy claims are simultaneously provided to the first pharmacy claims approval system.

11. The system of claim 8, wherein the instructions configure the system to:
route a portion of the first subset of pharmacy claims to the second pharmacy claims approval system in response to the first set of decisions.

12. The system of claim 8, wherein the second pharmacy claims approval system includes a machine learning model.

13. The system of claim 8, wherein the first set of decisions indicate if the first subset of pharmacy claims is approved.

14. The system of claim 8, wherein the second set of decisions indicate if the second subset of pharmacy claims is approved.

15. A non-transitory computer-readable storage medium, the computer-readable storage medium including instructions that when executed by a computer, cause the computer to:
access a plurality of pharmacy claims, wherein each pharmacy claim in the plurality of pharmacy claims including a set of pharmacy claim data;
for each pharmacy claim in the plurality of pharmacy claims, determine a respective aggregate rating of the pharmacy claim based on the set of pharmacy claim data;
based on the respective aggregate rating of the plurality of pharmacy claims, selectively process each of the plurality of pharmacy claims, wherein:
   the selectively processing is performed using at least one of:
      a first pharmacy claims approval system including a real-time claim analysis, or
      a second pharmacy claims approval system including a statistical-model-based claim analysis, and
   the selectively processing including:
      determining whether a first rating associated with a first subset of pharmacy claims has met a ratings threshold;
      in response to determining that the first rating has not met the ratings threshold, submit a first subset of pharmacy claims to a first pharmacy claims approval system;
      determining whether a second rating associated with a second subset of pharmacy claims has met the ratings threshold; and
      in response to determining that the second rating associated with the second subset of pharmacy claims has met the ratings threshold, submitting the second subset of pharmacy claims to the second pharmacy claims approval system including a neural network;
submit a portion of the second subset of pharmacy claims to the first pharmacy claims approval system;
receive, from the first pharmacy claims approval system:
   a first set of decisions for the first subset of pharmacy claims, and
   a set of validation decisions for the portion of the second subset of pharmacy claims;
store training data including:
   the portion of the second subset of pharmacy claims, and
   the set of validation decisions;
train the neural network of the second pharmacy claims approval system based on the training data to generate claims decisions for each of the plurality of pharmacy claims in the training data, wherein:
   the second pharmacy claims approval system is trained to generate a second set of decisions for the second subset of pharmacy claims, and
   the neural network is trained by performing training operations including:
      accessing the training data;
      extracting features from the training data to generate predictions by finding correlations among the extracted features of the plurality of pharmacy claims that affect the set of validation decisions, wherein the predictions include a probability that a given pharmacy claim of the plurality of pharmacy claims will be approved; and
      building the neural network of the second pharmacy claims approval system to generate new predictions for new pharmacy claims in response to analyzing the training data;
receive, from the second pharmacy claims approval system, a second set of decisions for the second subset of pharmacy claims;
validate the second set of decisions based on the set of validation decisions;
cause display of the first set of decisions and the second set of decisions on a graphical user interface;
in response to determining that a respective claim of the plurality of pharmacy claims has been approved:

display the respective claim with a first visual indicator, identify a prescription drug associated with the respective claim, and fulfill the prescription drug without operator intervention by:

automatically controlling movement of a set of containers relative to an automated dispensing device, and automatically dispensing, via the automated dispensing device, the prescription drug into a container of the set of containers; and in response to determining that the respective claim has not been approved:

display the respective claim with a second visual indicator, and display a notification.

16. The non-transitory computer-readable storage medium of claim 15, wherein the set of pharmacy claim data includes drug data associated with a drug, physician data associated with a physician, pharmacy data associated with a pharmacy, benefit group data associated with a benefit group and member data associated with a member, and any combination thereof.

17. The non-transitory computer-readable storage medium of claim 15, wherein the portion of the second subset of pharmacy claims are simultaneously provided to the first pharmacy claims approval system.

* * * * *